US010411892B2

(12) United States Patent
Iyengar et al.

(10) Patent No.: US 10,411,892 B2
(45) Date of Patent: Sep. 10, 2019

(54) PROVIDING ENCRYPTED PERSONAL DATA TO APPLICATIONS BASED ON ESTABLISHED POLICIES FOR RELEASE OF THE PERSONAL DATA

(71) Applicant: International Business Machines Corporation, Armonk, NY (US)

(72) Inventors: Arun K. Iyengar, Yorktown Heights, NY (US); Ashish Kundu, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 14/981,160

(22) Filed: Dec. 28, 2015

(65) Prior Publication Data

US 2017/0187531 A1    Jun. 29, 2017

(51) Int. Cl.
```
H04L 9/32      (2006.01)
H04L 9/14      (2006.01)
H04L 9/30      (2006.01)
H04L 29/06     (2006.01)
H04L 29/08     (2006.01)
```

(52) U.S. Cl.
CPC ................. H04L 9/32 (2013.01); H04L 9/14 (2013.01); H04L 9/30 (2013.01); H04L 63/0428 (2013.01); H04L 63/123 (2013.01); H04L 63/062 (2013.01); H04L 63/205 (2013.01); H04L 67/02 (2013.01)

(58) Field of Classification Search
CPC ..... H04L 9/32; H04L 9/14; H04L 9/30; H04L 63/0428; H04L 63/123; H04L 9/3247
See application file for complete search history.

(56) References Cited

U.S. PATENT DOCUMENTS

| | | | | |
|---|---|---|---|---|
| 2005/0262575 A1* | 11/2005 | Dweck | ................ | H04L 63/0428 726/28 |
| 2006/0047605 A1* | 3/2006 | Ahmad | ............... | G06F 21/6245 705/64 |
| 2006/0080538 A1* | 4/2006 | Kusuda | ................. | G06T 1/0071 713/176 |
| 2008/0115191 A1* | 5/2008 | Kim | ..................... | G06F 21/6245 726/1 |
| 2010/0122091 A1* | 5/2010 | Huang | .................. | H04L 63/067 713/171 |
| 2016/0241399 A1* | 8/2016 | Huang | ...................... | H04L 9/30 |

(Continued)

OTHER PUBLICATIONS

Daniel Griesser, "jCryption 3.1.0," http://www.jcryption.org/, Oct. 14, 2015, 1 page.

(Continued)

*Primary Examiner* — Kambiz Zand
*Assistant Examiner* — Tongoc Tran
(74) *Attorney, Agent, or Firm* — David Zwick; Ryan, Mason & Lewis, LLP

(57) ABSTRACT

A request is received for personal data associated with a user from an application. One or more policies are established for release of the requested personal data. The requested personal data is provided to the application in encrypted form. One or more decryption keys are then sent to the application in accordance with the established policies, the one or more decryption keys being utilizable for decrypting the encrypted personal data.

20 Claims, 7 Drawing Sheets

(56) References Cited

U.S. PATENT DOCUMENTS

2017/0104762 A1* 4/2017 Feng .................. G06F 21/6218
2017/0185497 A1* 6/2017 Luo .................... G06F 11/2069

OTHER PUBLICATIONS

Information Security Research Labs, "Analysis of Screen Capture Malware," TEQIP-II Sponsored Workshop on Information Security & Cryptography, http://isea.nitk.ac.in/currproj/09IS18F, Sep. 14-16, 2014, 2 pages.

Dan Goodin, "Hackers Break SSL Encryption Used by Millions of Sites: Beware of BEAST Decrypting Secret PayPal Cookies," http://www.theregister.co.uk/2011/09/19/beast_exploits_paypal_ssl/, Sep. 2011, 5 pages.

E. Bertino et al., "An Efficient Time-Bound Hierarchical Key Management Scheme for Secure Broadcasting," IEEE Transactions on Dependable and Secure Computing, Apr. 2008, pp. 65-70, vol. 5, No. 2.

Wen-Guey Tzeng, "A Time-Bound Cryptographic Key Assignment Scheme for Access Control in a Hierarchy," IEEE Transactions on Knowledge and Data Engineering, Jan. 2002, pp. 182-188, vol. 14, No. 1.

Hung-Yu Chien, "Efficient Time-Bound Hierarchical Key Assignment Scheme," IEEE Transactions on Knowledge and Data Engineering, Oct. 2004, pp. 1301-1304, vol. 16, No. 10.

Xun Yi, "Security of Chien's Efficient Time-Bound Hierarchical Key Assignment Scheme," IEEE Transactions on Knowledge and Data Engineering, Sep. 2005, pp. 1298-1299, vol. 17, No. 9.

X. Yi et al., "Security of Tzeng's Time-Bound Key Assignment Scheme for Access Control in a Hierarchy," IEEE Transactions on Knowledge and Data Engineering, Jul./Aug. 2003, pp. 1054-1055, vol. 15, No. 4.

\* cited by examiner

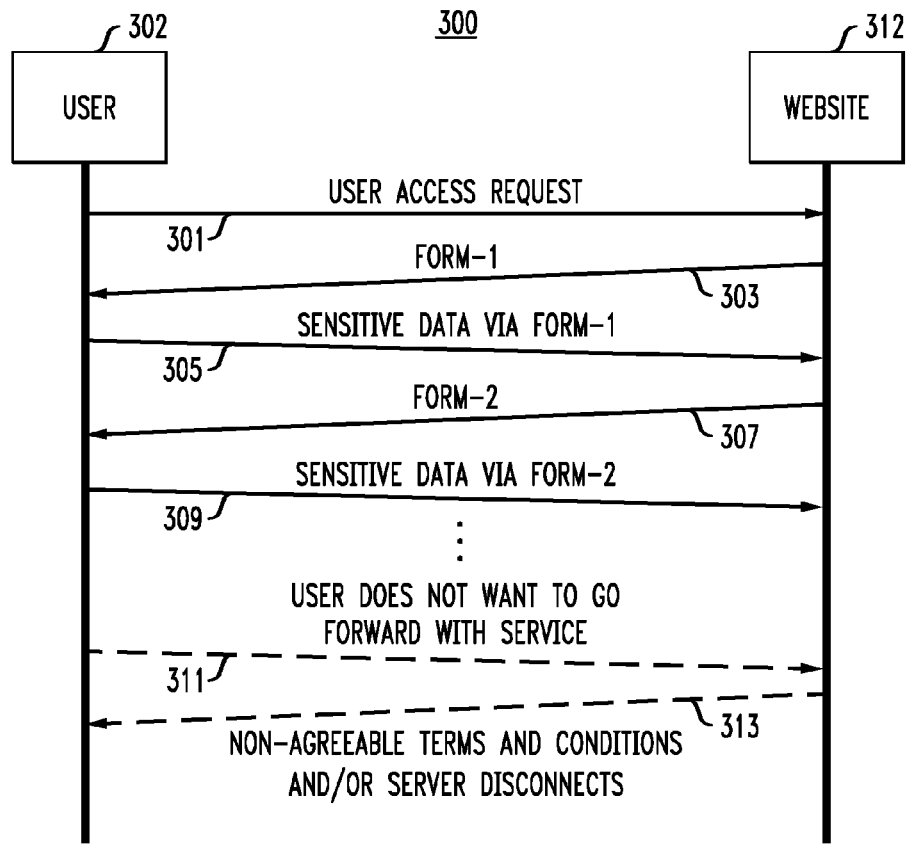
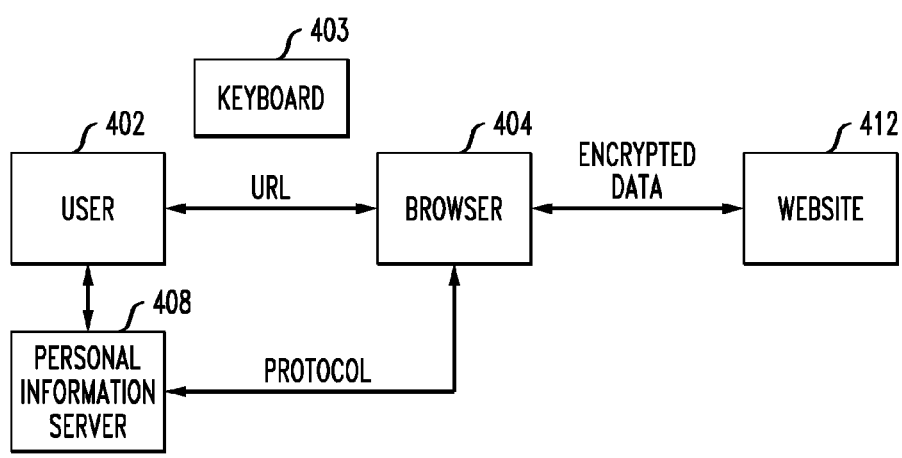

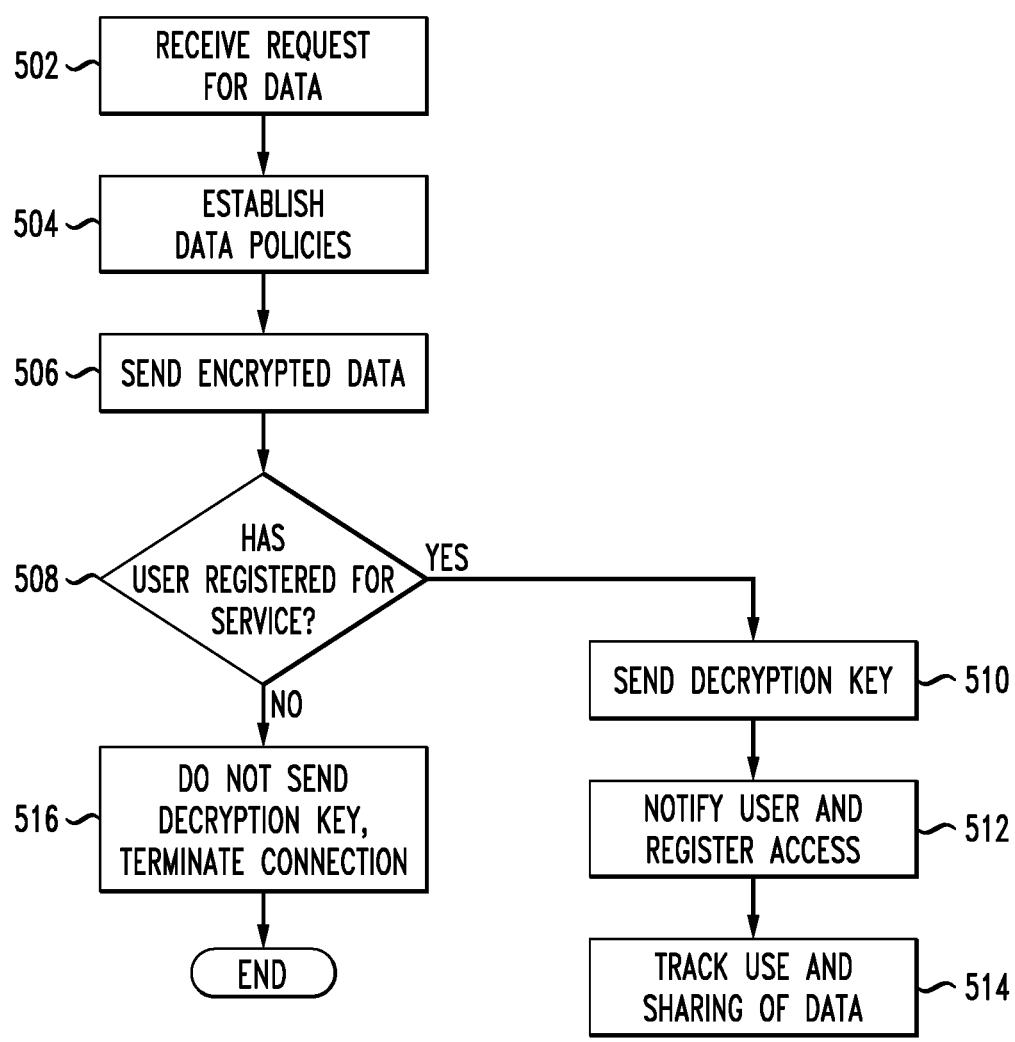

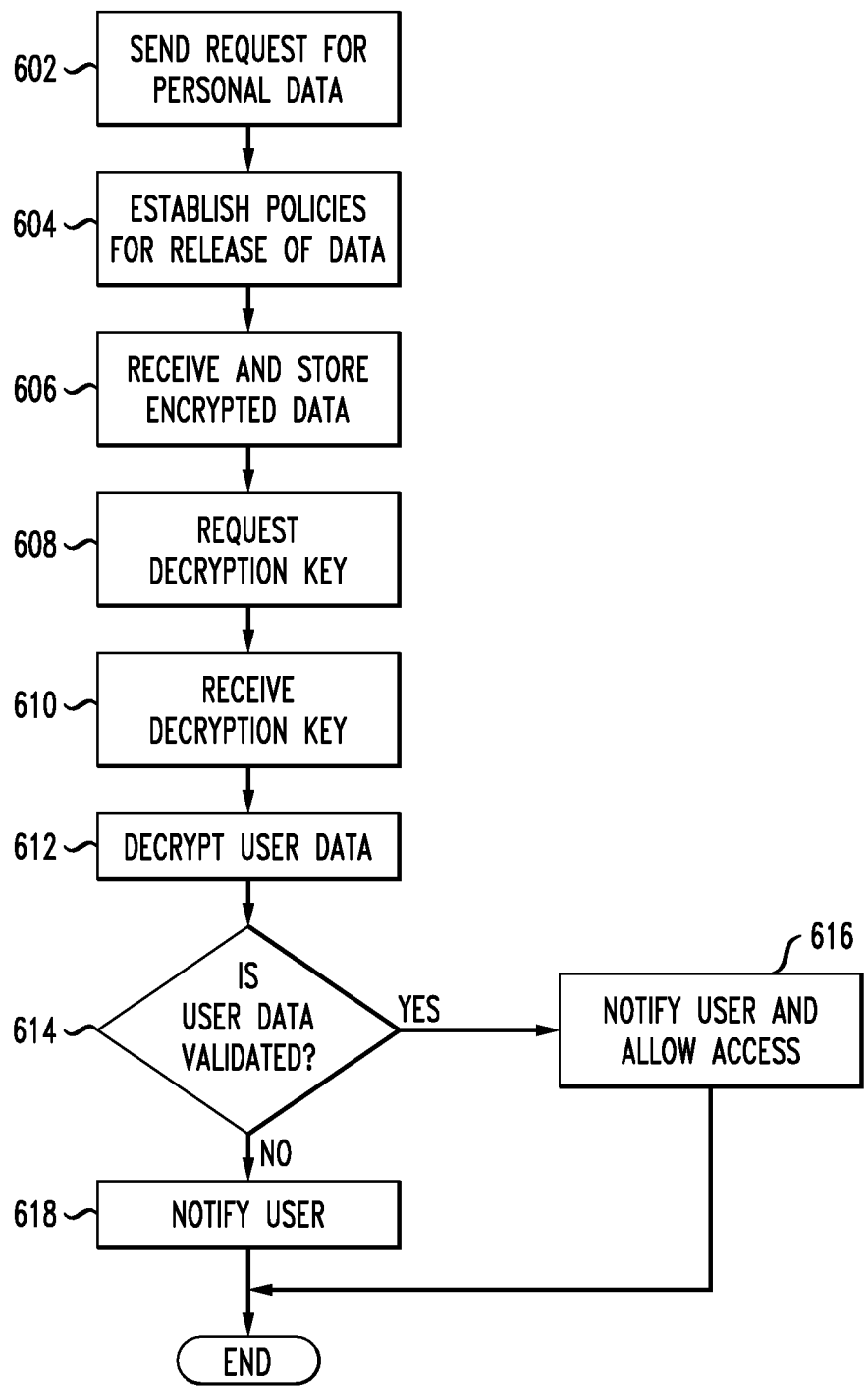

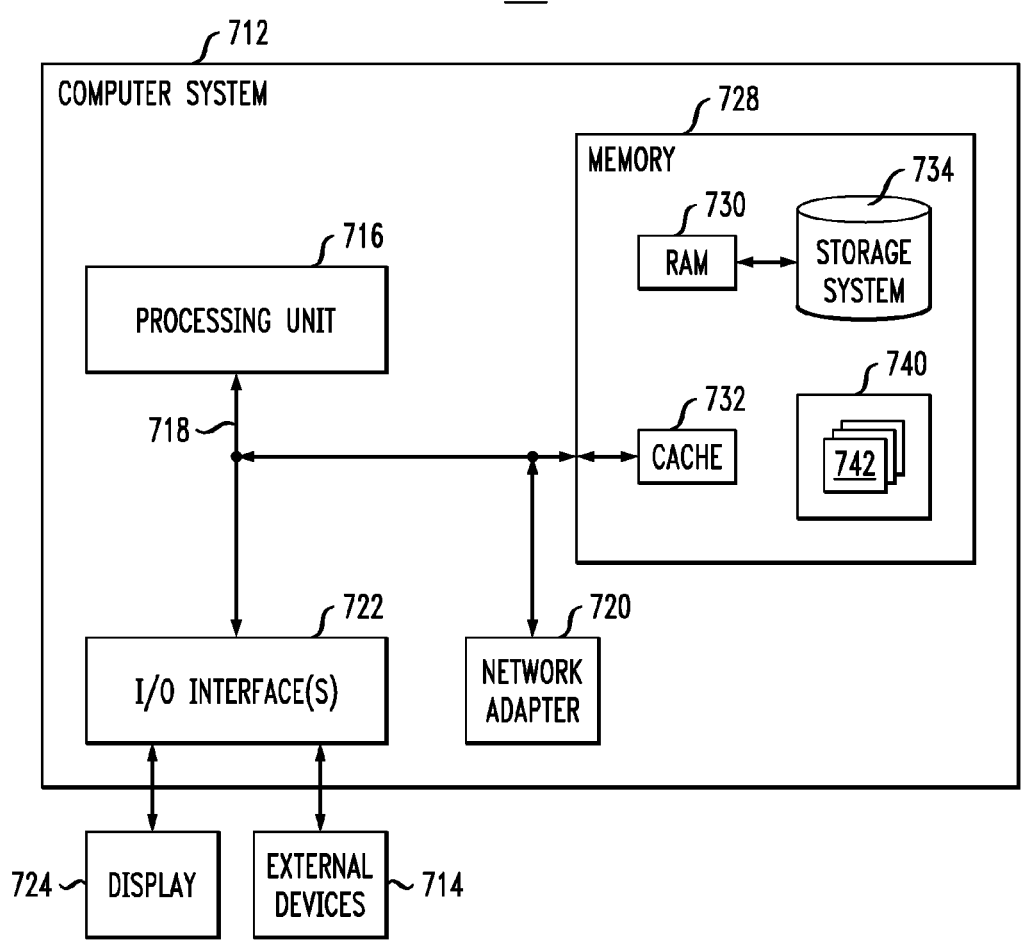

PROVIDING ENCRYPTED PERSONAL DATA TO APPLICATIONS BASED ON ESTABLISHED POLICIES FOR RELEASE OF THE PERSONAL DATA

BACKGROUND

The present invention relates to data management, and more specifically, to managing release of user data. Organizations and other entities utilize user data in a variety of contexts. Websites, applications, social networks, and other entities, for example, often collect personal data or information associated with different users. In some cases, a user's personal data or information is collected in conjunction with the user signing up for a web service or purchasing a product from a given entity. After the user's personal data is collected, the given entity may share such data with other entities.

SUMMARY

Embodiments of the invention provide techniques for managing the release of personal data associated with a user.

For example, in one embodiment, a method comprises the following steps. A request is received for personal data associated with a user from an application. One or more policies are established for release of the requested personal data. The requested personal data is provided to the application in encrypted form. One or more decryption keys are then sent to the application in accordance with the established policies, the one or more decryption keys being utilizable for decrypting the encrypted personal data.

BRIEF DESCRIPTION OF THE DRAWINGS

FIG. 3 depicts an exchange of personal data between a user and a website.

FIG. 4 depicts another example of providing personal data associated with a user to a website, according to an embodiment of the present invention.

FIG. 5 depicts a process for managing the release of personal data associated with a user, according to an embodiment of the present invention.

FIG. 6 depicts another process for managing the release of personal data associated with a user, according to an embodiment of the present invention.

FIG. 7 depicts a computer system in accordance with which one or more components/steps of techniques of the invention may be implemented.

DETAILED DESCRIPTION

Illustrative embodiments of the invention will be described herein in the context of illustrative methods, systems and apparatus for managing the release of personal data associated with a user. However, it is to be understood that embodiments of the invention are not limited to the illustrative methods, systems and devices but instead are more broadly applicable to other suitable methods, systems and devices.

Various organizations and entities are increasingly requesting large volumes of data from users in exchange for access to services or products. This is due in part to the proliferation of new technologies such as social networks, mobile devices, sensors, and cloud computing. The requested data often includes personal data associated with the user. The personal data may be sensitive data, which is thus increasingly susceptible to security threats at various stages of transmission. As the frequency of requests increases, concerns are raised about privacy and unauthorized dissemination of data. As a result, users seek better information regarding how their personal data will be utilized, increased control over how personal data is provided, and accountability for the organizations or other entities requesting the data.

Controlling access to personal data is a growing field in data management, driven in part by the increasingly large volumes of data transmitted over networks such as the Internet via the World Wide Web. A large portion of transmitted data is created by private consumers whose concerns for privacy have risen in relation to the increase in available data. That is, a user may desire to understand and control who has access to his or her personal data. For example, a website, web service, application or other entity may request personal information associated with a user prior to allowing the user to use an offered service or to purchase a product. The user, however, may wish to protect such information from security threats, such as phishing, spamming, and social engineering. As another example, users may be concerned with the second-hand sharing of information by a website, web service provider, application or other entity.

Figure 1:
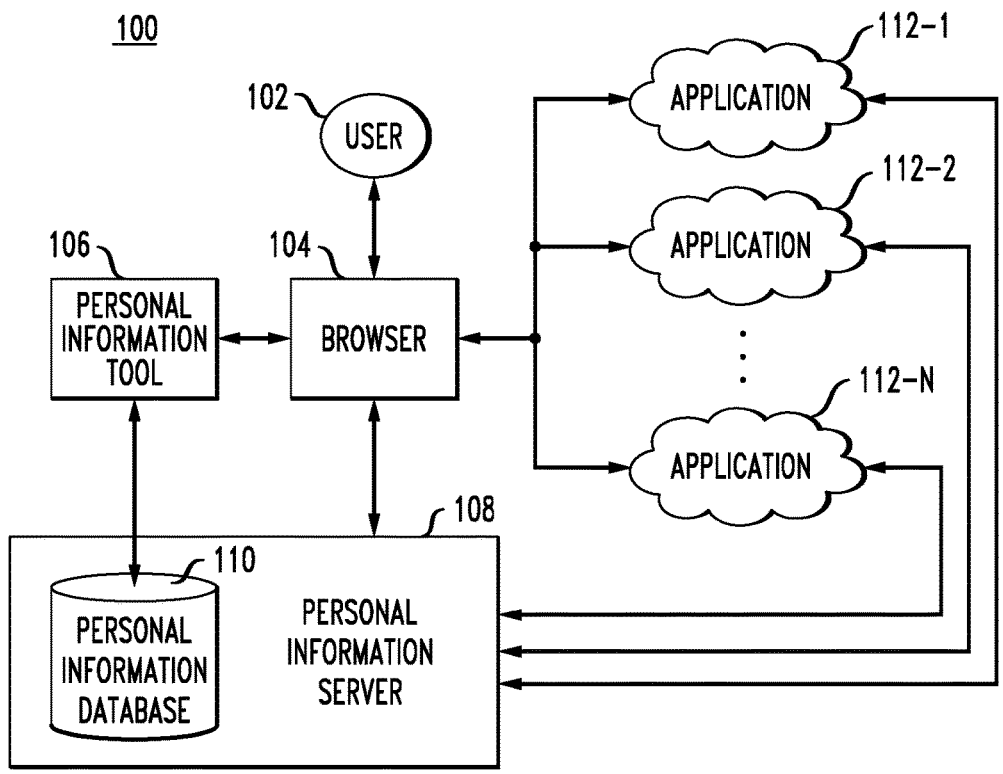
FIG. 1 depicts a system for managing the release of personal data associated with a user, according to an embodiment of the present invention.

FIG. 1 depicts a system 100, which may be used to manage the release of personal data associated with a user. As shown in FIG. 1, the system 100 includes a user 102, browser 104, personal information tool (PIT) 106, personal information server (PIS) 108, personal information database (PIDB) 110 and applications 112-1, 112-2, . . . 112-N collectively referred to herein as applications 112.

User 102 may represent a single person, or a group of persons. For example, an enterprise such as a business may represent itself as a user of a particular service. In this case, the personal data associated with the user 102 is enterprise data. Individual members or groups of members within an enterprise may also be considered as user 102 in some embodiments.

As shown in FIG. 1, the user 102 utilizes browser 104 to interact with PIT 106, PIS 108, PIDB 110 and applications 112. The combination of the user 102 and browser 104 may be referred to herein as a user device. The browser 104, in some embodiments, is a web browser application running on a device operated by the user 102. The browser 104, however, need not be a dedicated web browsing application. In some embodiments, the browser 104 is part of another application such as a social networking application. In other embodiments, the browser 104 need not be part of an application at all but instead may be functionality of an operating system of a user device such as a smartphone, tablet, laptop, desktop, smartwatch, etc. Various other arrangements are possible, and thus the browser 104 should be broadly construed.

PIT 106 stores personal data associated with user 102. Such personal data may include, but is not limited to, information such as last name, first name, middle name, date of birth, addresses, work information, birth place, social security number, driving license number, passport number, visa information, etc. The PIT 106 encrypts the personal data for storage in PIDB 110, shown in system 100 as part of PIS 108. In other embodiments, however, the PIDB 110 may be implemented external to PIS 108. One or both the PIT 106 and the PIS 108 may be implemented via a virtual wallet, a USB or other pluggable device, software running on a user device, etc.

The PIT 106, PIS 108 and PIDB 110 may be accessible to a web server or a web browser, such as browser 104, via a web application programming interface (API). PIS 108 may support APIs for programmatic access to the personal data by applications 112.

Applications 112 request data from user 102, such as through a form on a website. A given one of the applications 112 may be, by way of example, the website itself, a web server or other web- or network-based system, etc. More generally, the applications 112 represent entities that request personal data of user 102, and may be implemented in various forms.

The user 102, via browser 104, submits the requested data. The browser 104 accesses PIT 106 to retrieve encrypted user data. In some embodiments, the data is selected from PIT 106 to fulfill requests from applications 112. For example, a website form may include a number of required fields of personal data. In some embodiments, the user 102 may fill the fields one by one using user interface features of the browser 104 and/or PIT 106. In other embodiments, multiple fields may be filled in simultaneously using user interface features of the browser 104 and/or PIT 106. In still other embodiments, applications may communicate with PIS 108 to receive personal data for user 102 stored in PIDB 110, possibly via the aforementioned APIs.

After personal data is provided to the applications 112, the PIT 106 and/or PIS 108 may also track various characteristics associated with the transmission of personal data to the applications 112. Such characteristics include, but are not limited to, data sent, date, time, location, destination website, IP-addresses of sender and receiver, network information, whether the connection is open or secure socket layer (SSL), etc. The tracking information and characteristics may be stored in PIDB 110.

Advantageously, some embodiments provide techniques for efficient control of access to a user's personal data in accordance with established privacy and security policies. Further, some embodiments provide techniques for safely granting access to personal data incrementally, based on policies established between the user and an application as well as the sensitivity of the requested data. Some embodiments also provide techniques allowing a user to track the dissemination of personal data after such data is provided to an application.

Figure 2:
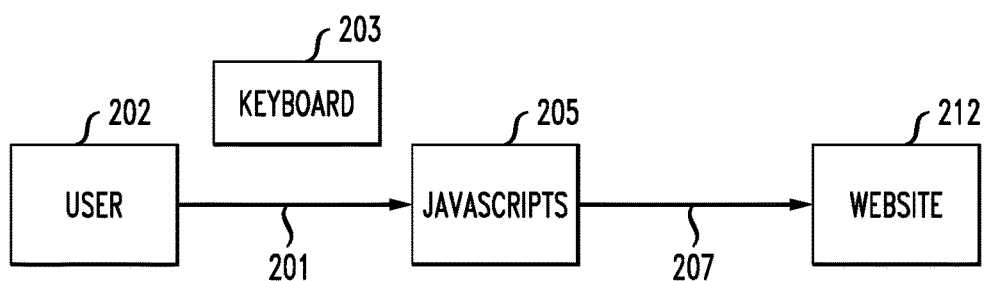
FIG. 2 depicts an example of providing personal data of a user to a website.

FIG. 2 depicts an example 200 of providing personal data of a user 202 to website 212. The website 212 is an example of one of the applications 112. As shown, the user 202 provides personal data to the website 212, where various different portions of the transmission between the user 202 and website 212 are subject to security threats. Assume that the user 202 wishes to control access to the personal data, limiting the access to the intended recipient, website 212, and reducing the threats posed by transmission of the personal data.

As shown in example 200, the personal data becomes vulnerable at various points during transmission, such as points 201, 203, 205 and 207. Due to such vulnerabilities, the user 202 is unable to ensure the security and privacy of the personal data transmitted to website 212. When inputting information at points 201 and 203, for example, the personal data is subject to threats including key-logging or screen-capturing malwares. At point 205, the personal data is subject to malicious JavaScripts, cross-site scripting (XSS), and cross-site request forgery (XSRF). At point 207, the personal data may be exposed as a result of a false Secure Socket Layer (SSL) certificate or insecure SSL. It is to be appreciated that such vulnerabilities and threats are presented by way of example only and that personal data may be subject to some, all or none of these and other possible threats during transmission between a user and a requesting application.

Further, the website 212 itself may pose various threats. The website 212, or other application requesting personal data, may ask for more information than is necessary to provide a desired service. The website 212 may also request data and fail to provide the claimed service, or provide the claimed service for a brief period before terminating the service and connection. These threats at website 212, along with the threat of phishing, also increase the risk that some or all of the user 202's personal data may be sold, leased, or otherwise exploited by the website 212 or a third party. The website 212, as an example, may use asynchronous JavaScript and XML (AJAX) type technologies or multiple step forms to collect user information before user 202 has agreed to register for an expected service. The website 212 may then terminate the connection before providing the service to the user 202, after having collected the user 202's personal information. An example of the use of multiple-step forms is described below in the context of FIG. 3. FIGS. 4-6 show examples and processes for managing the release of personal data.

FIG. 3 depicts an exchange 300 of personal data between a user 302 and a website 312 where multiple forms are used to provide personal data to the website 312. The user 302 initiates contact with the website 312 in step 301 when requesting access to a service offered by the website 312. The website 312 replies in step 303 by sending a first form, Form-1. User 302 sends sensitive data back using Form-1 in step 305. Website 312 sends a second form, Form-2, requesting additional personal data in step 307. The user 302 provides the additional sensitive data via Form-2 in step 309. After providing sensitive data in multiple step forms, the user 302 may decide in step 311 to not go forward with the service offered by website 312. At the recognition of non-agreeable terms and conditions or server disconnection by website 312, the process is terminated in step 313.

FIGS. 2 and 3 illustrate various difficulties associated with the transmission of personal data. Several observations of desired characteristics for managing personal data used in some embodiments are discussed below. It is to be appreciated, however, that embodiments need not provide all or even any of the specific characteristics described below.

Managing personal information, such as inputting personal data to web forms, is a process that is typically carried out by a user multiple times. For example, each time a user wants to purchase a product from a different website, the user is typically required to enter personal information such as the user's name, address and credit card information. It may be desirable to at least partially automate population of required fields to reduce the time needed to purchase products, sign up for web services, etc., thereby increasing user productivity and avoiding errors.

Keeping track of which websites, or more generally applications, have received personal information is also a difficult task. By tracking which websites, services or other applications have received information, such applications may be held accountable for the dissemination of personal information.

The use of a common information portal, such as PIS 108, can allow a user to share information with different services or application providers in a controlled manner. The PIS 108, possibly via PIDB 110, can record the information which each application provider has received. For example, a user may use a phone or other device to access a portal provided by PIS 108 and provide a key for accessing his or her personal information. A service provider can then access the portal and use the key to gain access to that user's personal information. Social engineering and tele-phishing can be prevented in this manner, or at least have their impacts minimized.

Websites and other applications can carry out phishing and other scams by asking a user to provide his or her information and then not providing the expected level of service. In some cases, a user may begin to sign up for a service and enter various personal information in one or more forms. The forms may use AJAX type technologies or multiple step forms to obtain personal information associated with the user before the user ultimately decides to sign up for the service. It would be desirable to provide the user with the ability to prevent the website or other application from gaining access to such information until after the user decides to sign up for the service, as well as the ability to enforce need-to-know principles and/or time-to-check-time-to-use requirements.

As described above, various websites may violate the need-to-know principle by asking for user information in a step by step manner, or on multiple pages or forms. Sometimes a user will input various personal information and then discover that the website or application is requesting certain data that the user does not wish to share. For example, a user may input his or her name and address in a first form and then be asked for a social security number or driver's license identification in a subsequent form. The user, at this point, may choose to cancel or abort signing up for the website or application, but the website has still obtained the user's name and address. As another example, websites often ask the user to sign or accept various terms and conditions, privacy policies, or pay unexpected fees at the end of a registration process. If a user finds the terms and conditions, privacy policies, or fees unacceptable and cancels or aborts the signup or registration process, the website has still obtained various personal information of the user. In some cases, a website will set a timer for accepting such terms and conditions which is insufficient to allow the user to read and accept the terms and conditions. When the timer expires, the session may be reset, and the website may have gained access to the user's personal information with no strings attached.

In addition, it would be desirable in some cases to permit the user to prevent, control or track the dissemination of personal information by applications. For example, websites and other applications may rent, sell, lease or give out personal information to other providers or applications. Users typically have no control over such dissemination and lack the ability to prevent or track the dissemination of their personal information.

As explained above and further detailed below, some embodiments provide a PIT such as PIT 106 allowing a user such as user 102 to manage the transmission of personal data via a PIS such as PIS 108. While FIG. 1 shows a system 100 wherein the PIT 106 and PIS 108 are distinct, in other embodiments a single device may implement both the PIT 106 and PIS 108, such as a USB or other similar portable device, discussed in conjunction with FIG. 1 above. Some embodiments allow users to control or manage the release of requested personal data using a set of established security policies based on criteria such as, but not limited to, whether the user agrees to register for a web service, negotiating a trust agreement with the web service, negotiating a service level agreement (SLA) with the web service, negotiating a quality of service (QoS) agreement with the web service, etc. Personal data may be released by the PIS and/or PIT using specific encryption keys provided to the web service or other application based on the established security policies.

The PIT and/or PIS may also provide various other capabilities and features. For example, in some embodiments different encryption keys are used for different portions of requested personal data. The PIT and/or PIS may thus use different encryption for different portions of the data sent to a website or other application. The PIT and/or PIS may use one or more random salts in conjunction with the encrypted personal data in order to determine sources of potential leakage. The PIT and/or PIS may provide requested personal data to the website or other application in encrypted form, to be followed by the encryption keys at a later time based on established security policies. The website or other application may decrypt the personal data, by way of example, in response to the user signing up for a service offered by the website or application. Decryption may be activated by sending decryption keys from the PIT and/or PIS to the website or application. The sending of such keys may be automatic in response to satisfying the established policies, such as negotiation of a trust, SLA, or QoS agreement.

In some embodiments, a signature of the encrypted data is computed utilizing a private key of the website or other application. The signature can then be verified by the PIT and/or PIS utilizing a public key of the application obtained from a key server for added security.

Also, the personal data can be organized into a hierarchy comprising two or more different levels utilizing different encryption in some embodiments. Access to the user's personal information can then be granted to each level separately by sending a decryption key for a first level at a first time and sending subsequent decryption keys for subsequent levels at appropriate times. Thus, personal data may be provided to the application in a manner that allows the website to decrypt only portions of the data. In some embodiments, the encryption/decryption keys are different for different applications or sessions. In other words, the PIT and/or PIS may re-encrypt data for each application or each session such that ciphertexts are not re-usable.

Further, in some embodiments one or more watermarks can be added to the personal data prior to providing the data to an application in encrypted form. Random salts, as discussed above, may be used to watermark personal data in some embodiments. Other techniques, however, may be utilized to watermark personal data in other embodiments. The watermarks can be utilized to trace propagation of the personal data by applications. Advantageously, watermarking allows users more control over distribution of personal data, with knowledge of who has and had access to the personal data and for how long, as well as improving data consistency by centralizing storage and authorizations for access.

In an exemplary embodiment, a user and website engage in a protocol in which the user learns information regarding the service being provided, the information required to register for the service, and the terms and conditions, along with other relevant information. The user determines whether the terms and conditions are acceptable, and may optionally engage in negotiations with the server for release of personal data as will be described in further detail below. The user can thus decide whether to register for the service before releasing personal data to the application.

An enterprise may also represent itself as a user. The personal data becomes enterprise data, and the end-user is part of an enterprise. An identity of a user maybe created out of the data and certificates from authorized/trusted entities vouching for the information. Partial identities can be computed and shared with the servers.

FIG. 4 depicts an example 400 of providing personal data of user 402 to website 412 using PIS 408. In the example 400, the user 402 selects and provides encrypted data to website 412 using security protocols via PIS 408.

User 402 inputs a URL into browser 404 using keyboard 403 to request access to website 412. When the user 402 accesses the website 412, the browser 404 and/or PIS 408 may retrieve a public key or certificate of the website 412 from a domain name system (DNS) server, a key server, etc. for use in computing the aforementioned signatures. After the website 412 requests personal data and the user 402 is notified of the request, the browser 404 and/or PIS 408 may notify the website 412 that the user 402 intends to submit personal data with security policies in mind. The browser 404 and/or PIS 408 engages with the website 412 on a privacy policy negotiation, such as how personal data will be released to the website 412.

Browser 404 and/or PIS 408 engages with the website 412 on a privacy policy negotiation regarding how personal data will be used or released. The browser 404 and/or PIS 408 generates a hierarchy in terms of privilege level of requested personal data and permissions based on the negotiation and a need-to-know principle. Browser 404 and/or PIS 408 then uses a tool, such as a PIT not explicitly shown in FIG. 4, or a server, such as PIS 408, that contains user data in an encrypted manner to retrieve user data. The browser 404 and/or PIS 408 may then use a crypto protocol to establish a set of keys that are committed to by the browser 404 and/or PIS 408 to the website 412, without the browser 404 and/or PIS 408 yet disclosing the keys to the web site 412. For example, such protocols include time-bound hierarchical key generation schemes using the hierarchy generated above. The browser 404 and/or PIS 408 also sends encrypted data to the website 412 and sends back and verifies the signature of the encrypted data from the website 412. The signature may be stored in PIS 408.

The PIS 408 encrypts the user 402's personal data offline and dynamically. After data has been shared with the website 412, the PIS 408 may re-encrypt the data. The PIS 408 manages encryption keys and signatures of the data in encrypted or plaintext form, signed by the website 412. The PIS 408 may also implement encryption schemes that are time-bound so that portions of data may be decrypted by website 412 at different times. The PIS 408 allows the user 402 to read, write, and update stored encrypted data, and also manages signatures of encrypted data and/or plaintext signed by website 412.

The user 402, browser 404, and/or PIS 408 then determines whether to use the service offered by website 412. After determining to use the service offered by website 412, the PIS 408 provides encrypted personal data and plaintext non-sensitive data to the browser 404, which in turn provides the encrypted data to the website 412. During or after the requested data is provided to the website 412 in encrypted form, the user 402 can decide whether to allow the website 412 to decrypt the personal data. If the user 402 aborts a signup process, for example, the PIT or PIS 408 will not send the decryption keys to the website 412. If the user proceeds with signup, the PIT or PIS 408 sends the decryption keys to the website 412. The disclosure of keys to the website 412 may start with those essential for processing, and proceed in accordance with established policies and privilege levels. The key disclosure may be asynchronous, in that the user 402 or PIS 408 may only allow the website 412 to access portions of the data when the website 412 needs those portions of data for the first time and user 402 is ready to allow the website 412 access.

To protect the decryption keys from a compromised browser, such as browser 404, the decryption keys sent to the website 412 may be encrypted with a public key of the website 412. The website 412 may use its corresponding private key to decrypt and obtain the decryption keys. The website 412 and PIS 408 may alternatively engage in a Diffie-Hellman or other protocol so as to establish a shared or symmetric key used to encrypt the decryption keys.

The website 412 stores the encrypted data and asks the user 402 for permission to decrypt the data. When the user 402 authorizes access, the PIS 408 provides decryption keys to the browser 404, which then provides them to the website 412. The website 412 can then decrypt the personal data using the decryption keys. The website 412 may only be allowed to decrypt one or more portions of the data, as access to different portions of the data may be separately authorized by user 402 or PIS 408. Decryption may be activated automatically by the PIS 408 if a trust, SLA, or QoS agreement is negotiated. The website 412 then sends a signature of the encrypted data using its private key, and the browser 404 verifies the signature. The PIS 408 and the website 412 both store the signature. Thus, the PIS 408 may use the signature to ensure accountability for use of the data, and the website 412 stores the signature as proof of non-repudiation.

Advantageously, a PIS such as PIS 108 or PIS 408 may be used to provide real-time access to personal data at a granularity level defined by the user. The PIS provides a handle, or decryption key, that is non-replayable and is valid for a specific period of time. The handle is given to a data requester by the user. The data requester accesses the data by passing the handle and its credentials to the PIS.

FIG. 5 depicts a process 500 for managing the release of personal data associated with a user, from the perspective of the user providing the personal data to an entity. Process 500 may be performed at least in part by the browser 104, PIT 106 and/or PIS 108 of system 100. In step 502, a request for data is received. The request may be for personal data or other information associated with a user. Data policies for release of the requested data are established in step 504. In some embodiments, as discussed above, personal data may be arranged in a hierarchy based on its sensitivity. As an example, data such as the user's name or email address may be at the lowest level of the hierarchy, while the user's address, date of birth are at an intermediate level of the hierarchy, and the user's social security number or credit card information may be at a highest level of the hierarchy. Other hierarchies may include more or fewer levels as well as different information in the different levels. Each level of the hierarchy may have its own established policy for release of the data in that level. The relative strength of the encryption utilized may increase in successive levels of the hierarchy. In other embodiments, equal strength encryption may be used for different levels of the hierarchy, albeit with different keys. In some embodiments, different keys may be used for different fields of data in the same level of a hierarchy.

In step 506, the encrypted data is sent to the requester, such as an application, website, web server or other entity. A test is performed during step 508 to determine if the user has registered for the service, e.g., if the request for access should be granted. In some embodiments, this test may require the user, a PIT, or a PIS to provide an explicit authorization or confirmation that the user has registered for a service or otherwise agrees to the release of personal data to the requester. In other embodiments, the test may involve determining whether a PIT or PIS has successfully negotiated trust, SLA, or QoS agreements with the requester.

If it is determined during step 508 that the user has registered for the service, then one or more decryption keys are sent to the requester in step 510 and the user is notified and the access is registered in step 512. The use and sharing of data can then be tracked in step 514. If, however, it is determined during step 508 that the user has not registered for the service, then the decryption key is not sent and the connection is terminated in step 516.

FIG. 6 depicts a process 600 for managing the release of personal data associated with a user from the perspective of the entity seeking access to the personal data. A request for personal data is sent to a user requesting access to an application in step 602, and policies for release of the requested data are established in step 604. In step 606, the encrypted data is received and stored. Next, a request is sent for a decryption key in step 608. The decryption key is received in step 610, and the user data is decrypted in step 612. In step 614, a test is performed to determine whether the user data is validated. If it is determined during step 614 that the user data is validated, then the user is notified and allowed access to the application in step 616. If, however, it is determined during step 614 that the user data is not validated, then the user is notified in step 618.

Presented below are two use cases for managing the release of personal data associated with a user. It is to be appreciated, however, that the use cases described below are presented by way of example only, and that embodiments are not limited solely to the specific examples given. Various modifications may be made to the details in each use case, including combining features from the two different use cases with one another and adding or removing various other features described herein.

In the first use case, a user attempts to register for a web service provided by a given website. A DNS server, key server, or similar server architecture contains the public key or certificate of the given website. When the user accesses the given website, a PIT, PIS, or browser of the user retrieves the public key or certificate for the given website. The user, via a browser, PIT, and/or PIS also receives one or more forms from the given website and indicates via the browser, PIT and/or PIS that the user intends to submit personal data in accordance with security policies established between the user and the given website via the browser, PIT and/or PIS.

The browser, PIT and/or PIS engages with the given website in a privacy policy negotiation regarding how the given website will use or release requested personal data. After this negotiation, the user sends, via the browser, PIT and/or PIS, the requested data to the given web site in encrypted form. After the requested personal data is submitted in encrypted form, the user can review and decide whether to sign up for the web service offered by the given website, or whether to abort the process.

If the user aborts the process, the PIT and/or PIS does not send any keys to the given web site, and thus the given web site does not obtain access to the requested personal data. If the user proceeds with signing up for the web service, the PIT and/or PIS discloses the keys for decryption of the data to the given website. The disclosure of the keys may occur at different times. For example, the PIT and/or PIS may start by disclosing the keys to the given website that are essential for processing the user's registration while holding back other keys used to decrypt certain non-essential personal data. Key disclosure follows the privacy negotiation and privilege levels associated with the requested personal data. The key disclosure may be asynchronous to allow the web service access to the data only when the service needs the data for the first time and the user is ready to allow access. The user may indicate its decisions in a security policy. To protect keys from compromised browsers, the PIT and/or PIS encrypts the key using the public key of the given website, which then is decrypted by the given website using its private key. Alternatively, the PIT and/or PIS may engage in a Diffie-Hellman protocol with the given website in order to establish a shared key, which is then used to encrypt the decryption keys.

In a second use case, a user and a given website engage in negotiation of policies for the release of personal data, and the given website presents its request for data in accordance with the established policies. The given website informs the user of the required personal data as well as the service it provides. In other words, the given website informs the user of the information it needs to collect from the user in order to allow the user to use its services. The information needed may be presented as data, money, time, or any physical space in a manner permitting the user to select and specify the order for providing personal data, the level of sensitivity for different portions of the personal data, and possibly other details regarding the personal data or portions thereof collectively referred to herein as meta-information. Determining the order for providing personal data in some embodiments includes determining how to group different fields, items or portions of personal data as well as selecting, grouping, ordering and re-ordering such items and their sensitivity levels. The meta-information may also specify the security or encryption to be used for different portions of the personal data. For example, some portions may be provided in plaintext while other portions use different types of encryption.

The meta-information is then submitted to the given website. The given website reviews the meta-information and determines whether the user-defined policy for release of personal data is acceptable. If the user-defined policy is acceptable, the given website generates one or more web pages and/or registration forms conforming to the user-defined policy. If the given website finds the user-defined policy unacceptable, the user may be so informed and engaged to determine how to proceed such as negotiating particular terms of the user-defined policy. In some embodiments, the given website may provide the user with information regarding the available types and methods for securing personal information. For example, a given website may only support certain types of encryption. The particular parameters for different security methods may also be specified, such as required key size, encryption algorithms, etc.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments can make use of software running on a general-purpose computer or workstation. With reference to FIG. 7, in a computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

The bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 712 typically includes a variety of computer system readable media. Such media may be any available media that is accessible by computer system/server 712, and it includes both volatile and non-volatile media, removable and non-removable media.

The system memory 728 can include computer system readable media in the form of volatile memory, such as random access memory (RAM) 730 and/or cache memory 732. The computer system/server 712 may further include other removable/non-removable, volatile/nonvolatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 718 by one or more data media interfaces. As depicted and described herein, the memory 728 may include at least one program product having a set (e.g., at least one) of program modules that are configured to carry out the functions of embodiments of the invention. A program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc., one or more devices that enable a user to interact with computer system/server 712, and/or any devices (e.g., network card, modem, etc.) that enable computer system/server 712 to communicate with one or more other computing devices. Such communication can occur via I/O interfaces 722. Still yet, computer system/server 712 can communicate with one or more networks such as a LAN, a general WAN, and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
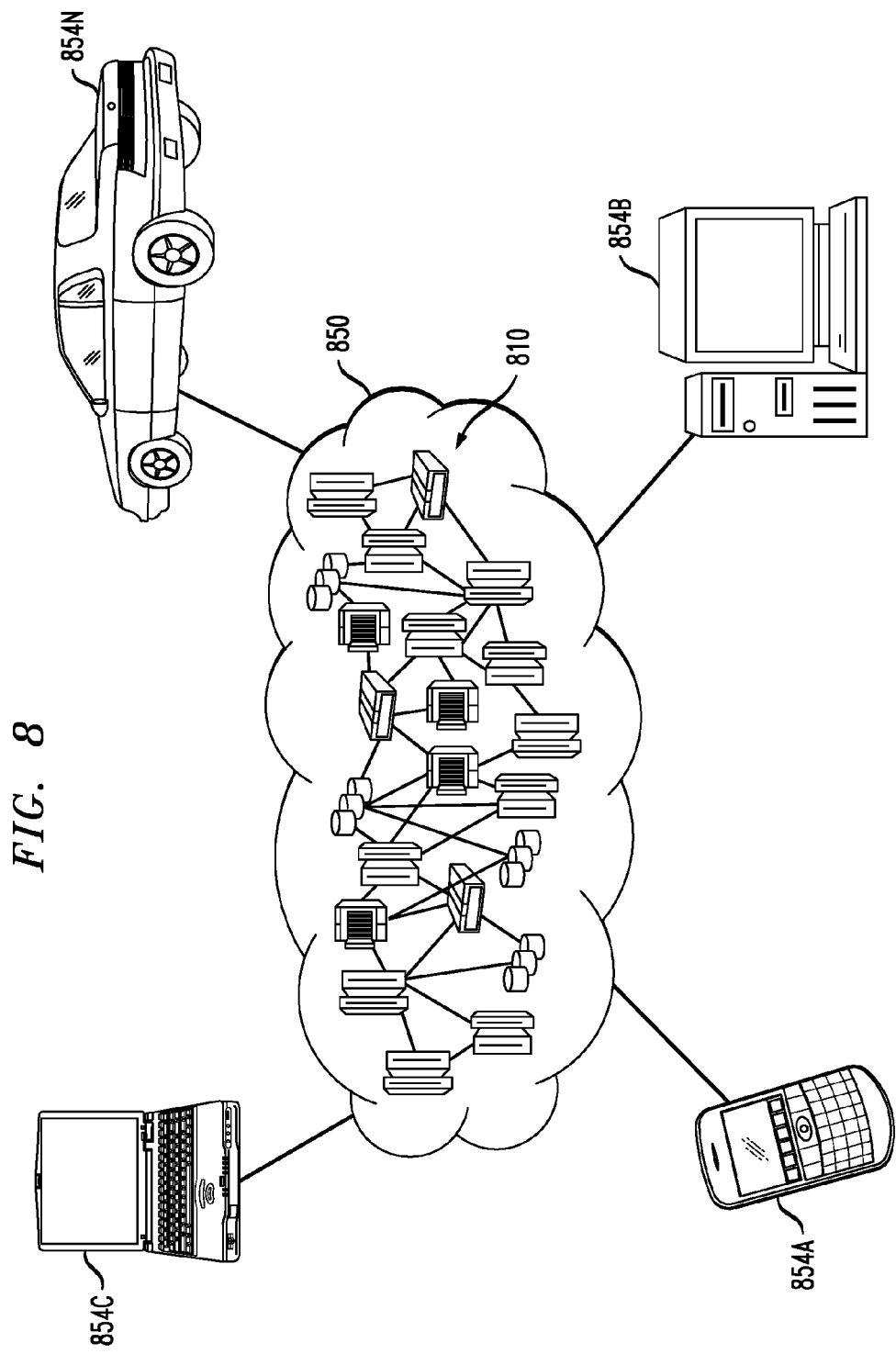
FIG. 8 depicts a cloud computing environment, according to an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
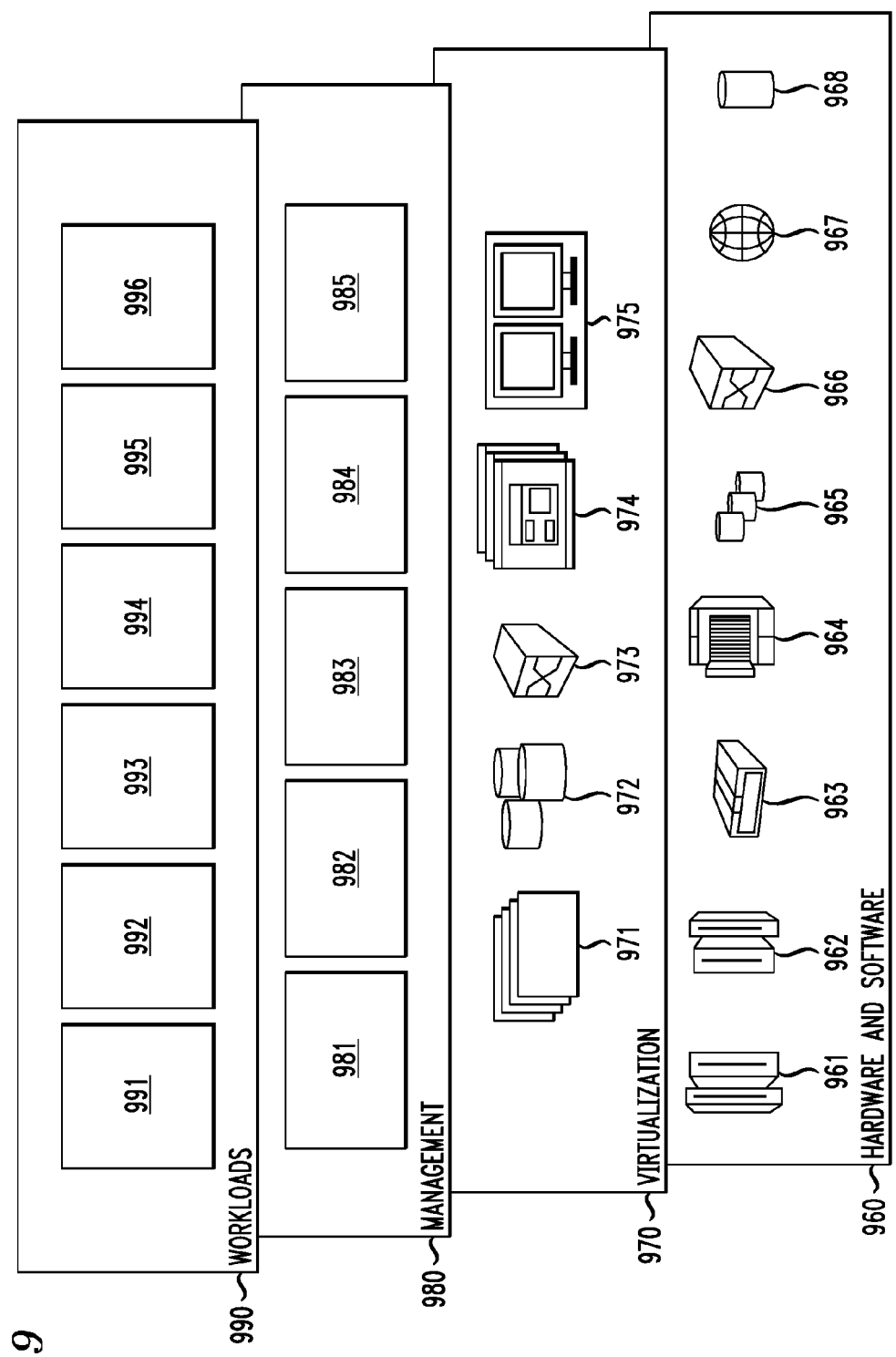
FIG. 9 depicts abstraction model layers, according to an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and personal data processing 996, which may perform various functions described above with respect to controlled release of a user's personal data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving a request for personal data associated with a user from an application, wherein the requested personal data comprises a plurality of items;
    establishing one or more policies for release of the requested personal data;
    determining privacy levels associated with respective ones of the plurality of items, wherein different privacy levels utilize different encryption methods;
    providing the requested personal data to the application in encrypted form; and
    sending decryption keys to the application in accordance with the established policies, the decryption keys being utilizable for decrypting the encrypted personal data and wherein the decryption keys are different for each privacy level;
    wherein the method is performed by at least one processing device configured for communication with the application over at least one network.

2. The method of claim 1, wherein the established policies specify release of the requested personal data based on whether the user agrees to register for the web service.

3. The method of claim 1, wherein the established policies specify release of the requested data based on at least one of:
    negotiating a trust agreement with the web service;
    negotiating a service level agreement with the web service; and
    negotiating a quality of service (QoS) agreement with the web service.

4. The method of claim 1, wherein the established policies comprise permissions for release of different portions of the requested data, and wherein providing the requested personal data to the application in encrypted form comprises:
    establishing encryption keys associated with the different portions of the requested personal data;
    encrypting each portion of the requested personal data utilizing its associated encryption key; and
    sending encrypted portions of the requested personal data to the application.

5. The method of claim 4, further comprising receiving from the application a signature of the encrypted personal data, the signature being computed utilizing a private key of the application.

6. The method of claim 5, further comprising:
    verifying the signature of the encrypted personal data utilizing a public key of the application obtained from a key server; and
    storing the signature of the encrypted personal data as proof of non-repudiation of the negotiated privacy policy.

7. The method of claim 1, wherein the personal data is organized into a hierarchy comprising two or more different levels utilizing different encryption.

8. The method of claim 7, wherein granting access by the application to the requested personal data comprises:
    granting access to a first one of the levels of personal data at a first time by sending a first decryption key associated with the first level to the application at the first time; and
    granting access to a second one of the levels of personal data at a second time different than the first time by sending a second decryption key associated with the second level to the application at the second time.

9. The method of claim 1, wherein sending the decryption keys to the application comprises:
    encrypting the decryption keys using one of a public key of the application obtained from a key server and a shared key established with the application; and
    providing the encrypted decryption keys to the application.

10. The method of claim 1, further comprising negotiating an order for providing the plurality of items to the application.

11. The method of claim 1, further comprising adding one or more watermarks to the personal data prior to providing the personal data to the application in encrypted form.

12. The method of claim 11, further comprising tracing propagation of the personal data by the application utilizing the one or more watermarks.

13. A computer program product comprising a computer-readable storage medium for storing computer readable program code which, when executed, causes a computer to perform the method of claim 1.

14. An apparatus comprising:
    a memory; and
    at least one processor coupled to the memory;
    the processor being configured
        to receive a request for personal data associated with a user from an application, wherein the requested personal data comprises a plurality of items:
        to establish one or more policies for release of the requested personal data;
        to determine privacy levels associated with respective ones of the plurality of items, wherein different privacy levels utilize different encryption methods;
        provide the requested personal data to the application in encrypted form; and
        to send decryption keys to the application in accordance with the established policies, the decryption keys being utilizable for decrypting the encrypted personal data and wherein the decryption keys are different for each privacy level;
    wherein the apparatus is configured for communication with the application over at least one network.

15. A method comprising:
    sending a request for personal data associated with a user from an application to a first processing device associated with the user, wherein the requested personal data comprises a plurality of items;
    establishing one or more policies for release of the requested personal data;
    determining privacy levels associated with respective ones of the plurality of items, wherein different privacy levels utilize different encryption methods
    receiving the requested personal data from the first processing device in encrypted form;
    receiving decryption keys from the first processing device in accordance with the established policies, wherein the decryption keys are different for each privacy level; and
    utilizing the decryption keys to decrypt the encrypted personal data;
    wherein the method is performed by at least a second processing device implementing the application, the second processing device being configured for communication with the first processing device over at least one network.

16. The method of claim 15, further comprising:

validating the decrypted personal data based on the one or more policies; and sending a validation notification to the user, wherein the notification is one of synchronous or asynchronous.

17. A computer program product comprising a computer-readable storage medium for storing computer readable program code which, when executed, causes a computer to perform the method of claim 15.

18. The method of claim 1, wherein the application comprises a web service.

19. The apparatus of claim 14, wherein the application comprises a web service.

20. The method of claim 15, wherein the application comprises a web service.

\* \* \* \* \*